(12) United States Patent
Hesselmans et al.

(10) Patent No.: US 6,544,592 B1
(45) Date of Patent: Apr. 8, 2003

(54) AQUEOUS DISPERSION OF A POLYURETHANE CONTAINING BLOCKED REACTIVE SITES

(75) Inventors: Laurentius Cornelius Josephus Hesselmans, 's-Hertogenbosch (NL); Johanna Antonia Maria Van Den Goorbergh, Waalwijk (NL)

(73) Assignee: Stahl International B.V., Waalwijk (NL)

( * ) Notice: Subject to any disclaimer, the term of this patent is extended or adjusted under 35 U.S.C. 154(b) by 0 days.

(21) Appl. No.: 09/857,005
(22) PCT Filed: Oct. 16, 2000
(86) PCT No.: PCT/NL00/00739
§ 371 (c)(1), (2), (4) Date: Aug. 28, 2001
(87) PCT Pub. No.: WO01/27180
PCT Pub. Date: Apr. 19, 2001

(30) Foreign Application Priority Data

Oct. 15, 1999 (NL) .............................................. 1013299

(51) Int. Cl.[7] .............................. B05D 3/02; C08G 18/81
(52) U.S. Cl. ....................................... 427/385.5; 528/45
(58) Field of Search ............................ 427/385.5; 528/45

(56) References Cited

U.S. PATENT DOCUMENTS

| | | | | |
|---|---|---|---|---|
| 4,035,213 A | * | 7/1977 | Thoma et al. ............... | 156/231 |
| 4,701,480 A | | 10/1987 | Markusch | |
| 4,983,662 A | * | 1/1991 | Overbeek et al. ........... | 524/501 |
| 5,679,754 A | | 10/1997 | Larson et al. | |

FOREIGN PATENT DOCUMENTS

| | | | |
|---|---|---|---|
| EP | 004069 | * | 9/1979 |
| EP | 172362 | * | 2/1986 |
| EP | 0219677 A | | 4/1987 |
| EP | 0308115 A | | 3/1989 |
| EP | 332326 | * | 9/1989 |
| EP | 0 664 488 A | | 7/1995 |
| EP | 0664488 B1 | | 3/1998 |
| JP | 07-268272 | * | 10/1995 |
| JP | 08-253724 | * | 10/1996 |
| JP | 09-255751 | * | 9/1997 |
| WO | WO 93 24551 A | | 12/1993 |
| WO | WO 95 04305 A | | 2/1995 |

OTHER PUBLICATIONS

Zochniak et al, Plaste Kautsch., 2(10), 744–5, 1974.*

* cited by examiner

*Primary Examiner*—Erma Cameron
(74) *Attorney, Agent, or Firm*—Jeffrey D. Myers

(57) ABSTRACT

The invention relates to an aqueous dispersion of a crosslinkable polyurethane obtained by chain extension of a polyurethane prepolymer with a compound containing hydrazone functions having general formula (1), wherein $Q^1$ and $Q^2$ is a hydrazone functional group of formula (2), H or $R^1$, R and $R^1$ in formula (1) is an organic group which has no reactivity towards the hydrazone function, $R^2$ and $R^3$ in formula (2) is an organic group which has no reactivity towards the hydrazone function or H, x has a value from 1 to 10, and is preferably from 1 to 4 with the proviso that at least one of the groups $Q^1$ or $Q^2$ is of formula (2). The invention relates also to a process for a preparation of an aqueous dispersion of a crosslinkable polyurethane containing hydrazne functions, and to the application of the aqueous dispersion of a crosslinkable polyurethane together with a polyisocyanate, a polyketone—or a polyepoxide—functional material onto a substrate.

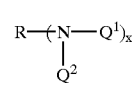

(1)

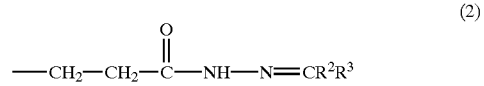

(2)

15 Claims, No Drawings

AQUEOUS DISPERSION OF A POLYURETHANE CONTAINING BLOCKED REACTIVE SITES

The present invention relates to an aqueous dispersion of a crosslinkable polyurethane obtained by chain extension of a polyurethane prepolymer with a compound containing hydrazone functions having the general formula:

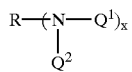

(1)

wherein $Q^1$ and $Q^2$ is a hydrazone functional group of formula (2), H or $R^1$

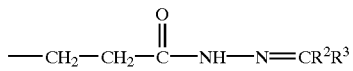

(2)

R and $R^1$ in formula (1) is an organic group which has no reactivity towards the hydrazone function,
$R^2$ and $R^3$ is an organic group which has no reactivity towards the hydrazone functions, with the proviso that at least one of the groups $Q^1$ or $Q^2$ in formula (1) is of formula (2) It relates to a process for the preparation of said polyurethane dispersion, to a process for the preparation of a crosslinked film or a coated substrate and to the obtained crosslinked film or coated substrate.

INTRODUCTION

It is well known that the performance and properties of coatings or films of aqueous polyurethane dispersions can be increased by the incorporation of crosslinkable groups in the polymer backbone and crosslinking of said polymers with relevant crosslinkers. For application onto temperature sensitive substrates, such as leather and artificial leather, the low-temperature baking types are of special interest. An overview of low baking type cross-linking for polyurethane dispersions is presented in EP-507407. This application describes further an improved crosslinking system in which carboxylic acid functional polymers are crosslinked by carbodiimide functional oligomers or polymers containing additional reactive functional groups, which contribute to the crosslinking.

An alternative crosslinking system is described in U.S. Pat. No. 4,598,121, which comprises the incorporation of a hydrazide functional chain extender in a polyurethane and crosslinking of the polyurethane with formaldehyde.

Since the use of formaldehyde type crosslinkers are expected to cause environmental problems, other types of compounds which are reactive towards the hydrazide function became of interest as crosslinkers, such as isocyanate functional, ketone functional or epoxide functional compounds. Research has shown that, because of the reactivity of these groups towards the hydrazide function, especially of the isocyanate functional compounds, the potlife of the hydrazide functional polyurethane together with the crosslinkers was limited. Moreover, it appeared that the polyurethane dispersions containing hydrazide functions became yellow in stability tests.

We now developed a new aqueous dispersion of a crosslinkable polyurethane in which a product containing blocked reactive sites is incorporated in the polymer chain. The obtained aqueous polyurethane dispersion combined with a relevant crosslinker is suitable for the preparation of a crosslinked film or of a crosslinked coating onto a substrate.

DESCRIPTION OF THE INVENTION

The present invention provides an aqueous dispersion of a crosslinkable polyurethane obtained by chain extension and/or chain terminating of an isocyanate functional polyurethane prepolymer with a compound which contains hydrazone functions having as the general formula:

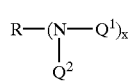

(1)

wherein $Q^1$ and $Q^2$ is a hydrazone functional group of formula (2), H, or $R^1$

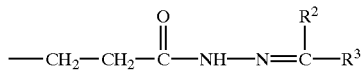

(2)

R and $R^1$ in formula (1) is an organic group which has no reactivity towards the hydrazone function,
$R^2$ and $R^3$ in formula (2) is an organic group which has no reactivity towards the hydrazone function,
x has a value from 1 to 10, and is preferably from 1 to 4 with the proviso that at least one of the groups $Q^1$ or $Q^2$ is of formula (2).

In an aqueous solution at pH above 7 the hydrazone function is stable, but at lower pH, or during drying at elevated temperatures the hydrazone function in the polyurethane reacts with water under formation of a ketone and a hydrazide function of formula

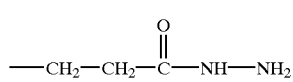

(3)

The resulting product which contains hydrazide functions can be crosslinked and/or chain extended by a polyisocyanate, a polyketone or a polyepoxy functional material.

Since the product of formula (1) is used as a chain extender and/or chain terminating group for isocyanate functional polyurethane prepolymers at least one of the groups Q must be a hydrogen. The invention therefore includes the aqueous dispersion of a polyurethane which contains as chain extender or chain terminating group a hydrazone functional compound of formula (1), wherein at least one of the groups groups $Q^1$ or $Q^2$ is H.

It appeared that under aqueous conditions only the NH or $NH_2$ function of the product of formula (1) reacts with a isocyanate functional material under formation of a urea function, while the hydrazone function remains intact. In the presence of only one hydrogen reactive amine in formula (1) the isocyanate functional material is just capped.

More preferably the product of formula (1) contains two or more hydrogen reactive amine functions and it can chain extend and/or crosslink a polyisocyanate functional material to obtain an aqueous dispersion of a polyurethane containing hydrazone functions. Accordingly the present invention relates to an aqueous dispersion of a polyurethane which preferably contains as chain-extender a hydrazone functional product, which contains at least two hydrogen functional amino groups.

Usually the product of general formula (1) which is used as chain extender in the aqueous polyurethane dispersion is prepared by reacting a hydrazide functional compound of formula

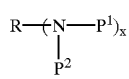
(4)

wherein
$P^1$ and $P^2$ is a hydrazide functional group of formula (3) or is H, or is $R^1$,
R and $R^1$, and x are as in formula (1)
with the proviso that at least one of the groups $p^1$ or $p^2$ has formula (3)
with an equimolar amount of a ketone functional compound of formula

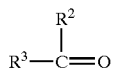

wherein $R^2$ and $R^3$ are as in formula (2).

The hydrazide functional compound is prepared from a polyamine by a method as described in U.S. Pat. No. 4,598,121. The polyamine has the structure conform formula (4) in which the hydrazide functional group P was originally hydrogen. According to this method the polyamine is first reacted with an alkyl-acrylate whereafter the obtained alkyl aminopropionate functional compound is reacted with hydrazine.

The hydrazide functional compound is a hydrazide functional alkylamine, a cycloalkylamine, an arylamine, an alkylpolyamine, a cycloalkylpolyamine, an arylpolyamine, an alkylamino-cycloalkylamine, a polyalkoxyamine, a polyalkoxypolyamine, an aminoalkylamine, an amino-poly (alkylamine).

The preferred hydrazide functional compound can be selected from a hydrazide functional 5-amino-1,3,3-trimethylcyclohexanemethylamine, methylpentanediamine, diaminohexane, 3,3'-dimethyl-4,4'-diaminodiyclohexylmethane, 4,4'-diamino-dicyclohexylmethane, a polyoxypropylenediamine with a molecular weight of around 230, 400, or 2000, a polyoxyethylenediamine with a molecular weight of around 600, 900, 2000, 4000 or 6000, a polyalkoxyethyleneamine with a molecular weight of around 600, 1000, 2000, a polyoxypropylenetriamine with a molecular weight of around 470, a long chain alkylamine with a mean molecular weight from 140 to 550, a (long chain alkyl)-aminopropylamine with a mean molecular weight from 280 to 360.

The ketone which is used for the blocking of the hydrazide function in the preparation of the product of formula (1) is prefarably acetone or butyl ketone.

The product of formula (1) is a polyamine which is modified by replacing an N—H function by a N-hydrazone function. The number of hydrazone functions can be varied from 0.1–1 equimolar amount regarding to the NH-functions in the polyamine.

Furthermore the invention relates to the process for the preparation of the aqueous dispersion of a crosslinkable polyurethane containing hydrazone functions comprising:

dispersion of an isocyanate functional polyurethane prepolymer in water, optionally in the presence of neutralizing agents and/or surfactants chain extension of the prepolymer with a hydrazone functional product containing at least two hydrogen functional amino groups, optionally in the presence of a surfactant, during or after the dispersion in water.

The isocyanate functional polyurethane prepolymer may be anionic, kationic of non-ionic and is prepared in a conventional way. EP 308115 presents an overview of suitable polyols and polyisocyanates for such polyurethane prepolymers.

The polyurethane dispersion can be made self-crosslinkable when the polyurethane contains both ketone and hydrazone functions. The invention therefore provides a process for the preparation of a selfcrosslinkable aqueous dispersion of a hydrazone and ketone functional polyurethane by using an isocyanate functional prepolymer containing ketone functions in the method described. The preparation of these types of prepolymers is described in U.S. Pat. No. 4,983,662.

The aqueous dispersions of crosslinkable polyurethane containing hydrazone functions obtained by the process of the invention may be used as coating compositions together with a crosslinking material. Accordingly the invention provides a process for the preparation of a crosslinked film or of a crosslinked coating onto a substrate comprising the steps of:

mixing the polyurethane dispersion containing hydrazone functions of the invention with a polyisocyanate, polyketone or polyepoxy functional material or aqueous dispersion thereof in which the ratio of functional groups is hydrazone: isocyanate or ketone is from 0.5 to 1.5 and in which the ratio of hydrazone: epoxy is from 0.3 to 1.2, applying said mixture onto a substrate evaporation of water and/or solvents When an aqueous dispersion of a polyurethane containing both hydrazone and ketone functions is used a self crosslinking systems is obtained. Therefore the invention includes the preparation of a crosslinked film or of a crosslinked coating onto a substrate comprising:

applying the hydrazone and ketone functional polyurethane dispersion onto a substrate and crosslinking the same by evaporation of water and/or solvents.

Another option is that products of formula (1) are not incorporated in a polyurethane structure, but are used as pure hydrazone functional products. Also in this case they can be employed as coating composition together with a crosslinking material. Accordingly, the invention provides the preparation of a crosslinked film or of a crosslinked coating onto a substrate comprising:

preparation of a mixture of a hydrazone functional material according to formula (1) in which Q is not H with a polyketone or poly-epoxy functional material, or with an aqueous dispersion of a, polyketone or polyepoxy functional material, and preferably with an aqueous dispersion of a polyisocyanate functional material in which the ratio of functional groups is hydrazone: isocyanate or ketone is from 0.5 to 1.5 and in which the ratio of hydrazone: epoxy is from 0.3 to 1.2, applying the mixture onto a substrate evaporation of water and/or solvents.

The hydrazone functional products or polyurethane dispersions offer, together with a crosslinker a coating material which has a comparable and sometimes even better performance and properties than those described in EP507407. Especially the crosslinking with a polyisocyanate functional material is very efficient.

The dispersions of hydrazone functional polyurethanes are better resistant to yellowing than those of the hydrazide functional polyuretanes described in U.S. Pat. No. 4,598,121. In combination with polyisocyanates as a crosslinker the dispersions of hydrazone functional polyurethanes have a longer pot-life than the dispersions of the hydrazide functional polyurethanes. The reason is that the protection of the hydrazide function by acetone is stable in water at pH>7 and the isocyanate function can only react with the hydrazide function after the acetone has been released during the film formation. Moreover, the crosslinking with polyisocyanate-, polyketone- or polyepoxy-functional materials is a method which gives less rise to environmental problems than the crosslinking of hydrazide functional compounds with formaldehyde, as described in U.S. Pat. No. 4,598,121.

Many additional ingredients may also be present in the application and crosslinking stage, for example fillers, colorants, pigments, silicons, matting agents, flow agents, and the like. These additional ingredients can be used when there is no or little interference with the crosslinking function, or, if there is interference, it contributes to an optimal application result.

The hydrazone functional products and aqueous dispersions of polyurethanes in combination with the polyisocyanate, polyketone or polyepoxy functional material may be used in adhesives, sealants, printing ink and in coatings. They may be applied on any substrates, including leather or artificial leather, metals, wood, glass, plastics, paper, paper board, textile, non-woven, cloth, foam and the like by conventional methods, including spraying, flow-coating, roller-coating, brushing, dipping, spreading and the like.

Various features and embodiments of the present invention are illustrated by the following examples. These examples are only illustrative and are not intended to limit the invention as claimed hereafter.

EXAMPLES

Example 1–6

Preparation of products containing hydrazone functions of formula(1).

Hydrazide functional amines were prepared by the method described in U.S. Pat. No. 4,598,121 by reaction of 1 mole of a mono- or polyamine with ethylacrylate, followed by reacting the obtained ethyl aminopropionate functional product with a stoichiometric amount of hydrazine hydrate. A stoichiometric amount of acetone was added to the hydrazide functional compound at ambient temperature while stirring. There was an increase of the temperature from about 20 to 50° C. due to the exotherm reaction. The reaction mixture was stirred for 30 min and cooled down. The ratio of amine or polyamine regarding to the ethylacrylate and thus to the obtained hydrazide functions and hydrazone functions is presented in table I. The amine concentration of the obtained hydrazone functional compounds were checked by titration with a 1M solution of stearylisocyanate in toluene and methoxy propylacetate. The hydrazone function remained intact during the titration for at least 5 min at the turning point. The end-point was detected by appearance of a isocyanate signal at 2240 $cm^{-1}$ by IR-spectroscopy. The amine concentration is presented in table I.

TABLE I

Hydrazone functional products of formula (1)

| Example no | Amine/polyamine (1 mole) | Amount of hydrazone per mole of diamine (mole) | Amine concentration in product (meq. g) Theoretical | Found (%) |
|---|---|---|---|---|
| 1 | Isophorene diamine | 0.90 | 5.60 | 5.56 |
| 2 | Isophorone diamine | 1.80 | 3.67 | 3.65 |
| 3 | Isophorone diamine | 3.80 | <0.2 | 0 |
| 4 | Methylpentaandiamine | 0.95 | 6.38 | 6.32 |
| 5 | Jeffamine T 403[a)] | 2.00 | 3.39 | 3.35 |
| 6 | Methoxyethylamine | 0.95 | 3.67 | 3.67 |

[a)]Jeffamine T-403 is a polyoxyethylene triamine containing 6.4 meq amino functions/g obtainable from Huntsman.

Example 7–12

Preparation of polyether based hydrazone functional polyurthane dispersions.

Under a nitrogen atmosphere 426 g (0.213 mole) of a polyurethane diol with a molecular weight of 2000, 340 g (0.3400 mole) of a polypropylene diol with a molecular weight of 1000 and 46.9 g (0.350 mole) of dimethylolpropanoic acid were heated to 70° C. while stirring. 444 g (2 mole) of 3-isocyanatomethyl-3,5,5-trimethylcyclohexylisocyanate (hereafter refered to as IPDI) was added and the mixture was heated to 100° C. and stirred for 2 hrs to form a polyurethane prepolymer. After 1 hr of reaction time 0.1 g of tinoctoate was added as catalyst. The reaction was cooled down and the amount of remaining NCO appeared to be 5.20%.

100 g of the polyurethane prepolymer was mixed with 3.22 g of triethylamine and the mixture was disperred in 120 g of water while stirring intensively.

The products of examples 1, 2, 4, and 1+5 or 1+6 were diluted 1:1 with water in an amount as mentioned in table II. The mixtures were added to the dispersed prepolymer within 5 min and the dispersion was stirred for 30 min. The NCO signals in the infrared spectra at 2240 $cm^{-1}$ were disappeared. The products were adjusted to a solids amount of 35% with water. In example 7 hydrazine was used in a comparative example to obtain a polyurethane dispersion without hydrazone functions. The pH and the hydrazone functionalities of the products are presented in table II.

TABLE II

Chain extension and/or chain terminating of a polyurethane prepolymer dispersion.

| Example | Hydrazone Functional Product of Example | Amount of Hydrazone Functional Product per 100 g of polyurethane prepolymer | pH of the obtained dispersions | hydrazone functionality of the obtained dispersions (meq/g) |
|---|---|---|---|---|
| 7 | | | 8.0 | |
| 8 | Hydrazine[3a] | 2.94 | 8.0 | — |
| 9 | 1 | 21.15 | 8.2 | 0.16 |
| 10 | 2 | 32.22 | 7.9 | 0.31 |
| 11 | 4 | 18.61 | 8.0 | 0.18 |
| 12 | 1 + 5 | 15.59 + 9.23 | 8.2 | 0.18 |
| 6 | 1 + 6 | 15.59 + 8.43 | | 0.21 |

[a]hydrazine was used in a comparative example to obtain a poylurethane dispersion without hydrazone functions.

Example 13

Preparation of a ketone functional polyurethane. Under a nitrogen atmosphere 182.33 g (0.13 mole) of a polyester diol with a OH number of 80 and containing ketone functions (available from NeoResins as PEC-205), 12.06 g (0.09 mole) of dimethylol-propanoic acid and 94.4 g of N-methyl-pyrolidone were heated to 70° C. while stirring. 88.8 g (0.4 mole) of IPDI was added and the mixture was heated to 100° C. and stirred for 2 hrs to form a polyurethane prepolymer. After 1 hr of reaction time 0.04 g of tinoctoate was added as catalyst. The reaction was cooled down and the amount of remaining NCO appeared to be 2.87%.

110 g of the polyurethane prepolymer was mixed with 2.75 g of triethylamine and the mixture was disperred in 120 g of water while stirring intensively. 1.79 g of hydrazine hydrate in 4.2 g of water was added within 5 min and the dispersion was stirred for 30 min. The NCO-signal in the IR-spectrum at 2240 $cm^{-1}$ was disappeared.

The product was characterised by a solids amount of 35%, a viscosity of 300 cps, a pH of 8.0, opaque appearance. Test results of the product as ketone functional crosslinking agent are presented in Example 14.

Example 14

This example is concerned with the evaluation of the crosslinked and not crosslinked films of the products of example 7 and example 8.

Films of thickness of 200 and 600 μm were prepared and dried at ambient temperature of:

the products of example 7 and example 8, of the combination of the product of example 8 and of example 8+3 with an equivalent amount of XR-5553, which is an NCO-crosslinker available from Stahl Holland, of the combination of the product of example 8 and an equivalent amount of Eurepox 756/67 W, which is an epoyfunctional resin from Witco.

of the combination of the product of example 8 and an equivalent amount of the ketone functional product of Example 13.

The mechanical properties, swelling percentages in ethanol and yellowing of the films were tested. The results obtained are set out in Table III.

These results show that the crosslinking of the hydrazone functional polyurethane with the isocyanate functional crosslinker is most efficient as is indicated by:

an increased film strain is obtained regarding to the other crosslinking systems a lower elongation is obtained regarding to the other cross-linking systems a low uptake of ethanol is obtained the films are not yellowing the films are recoatable The addition of more hydrazone functions by adding 5% of the product of example 3 and the corresponding amount of the isocyanate crosslinker results in a film with a higher crosslinking density which is indicated by a shorter elongation.

TABLE III

Crosslinking of hydrazone functional polyurethanes with several crosslinkers.

| Example | Cross-linker | Mechanical Properties (MPa)[a] | | | | | | elong.[b] | Wt[c] incr. | Yellow[d] |
| --- | --- | --- | --- | --- | --- | --- | --- | --- | --- | --- |
|  |  | M10 | M25 | M50 | M100 | M200 | M300 |  |  |  |
| 8 |  |  |  |  |  |  |  |  |  |  |
| 8 | — | — | — | 7.8 | 8.8 | 10.7 | — | 293 | 415 | — |
| 8 + 5% 3 | XR-5350 | 11.0 | 11.3 | 12.5 | — | — | — | 93 | 83 | — |
| 8 | XR-5350 | 11.9 | — | — | — | — | — | 18 | 88 | — |
| 8 | Europox 756/67 | — | — | 2.8 | 4.3 | — | — | 140 | 74 | — |
| 7 | Example 13 | — | — | 10.5 | 12.8 | — | — | 100 | 111 | + |
| 6 | — | — | — | 2.5 | 3.3 | 4.6 | 6.0 | 840 | gel | — |

Notes to table III
[a] MPa is megapascal ($10^6$ $Nm^{-2}$). The mechanical properties and elongation were measured with films which were stretched at a thickness of 600 μm on a MTS Synergie 200 apparatus. The values at 10 M, 25 M, 50 M, 100 M, 200 M and 300 M give tensile strenghts of the films while stretching them for respectively 10, 25, 50, 100, 200 and 300%.
[b] elong. is the maximal elongation before the film breaks measured on a MTS Synergie 200 apparatus
[c] wt. incr. is the proportional weight increase of a film drawn at 200 μm and which was immersed in water for 20 min at 20° C.
[d] yellow. is the yellow coloring of a film when stored for 1 week at 80° C.

Example 15

Preparation of a polycarbonate based hydrazone and ketone functional polyurethane dispersion.

Under a nitrogen atmosphere 302 g (0.151 mole) of a polycarbonate diol with a molecular weight of 2000 available from Stahl USA as PC-1122, 121.13 g (0.0864 mole) of a polyester diol with a OH number of 80 and containing ketone functions (available from NeoResins as PEC-205), 26.00 g (0.194 mole) of dimethylol-propanoic acid and 261 g of N-methyl-pyrolidone were heated to 70° C while stirring. 159.84 g (0.72 mole) of IPDI was added and the mixture was heated to 95° C. and stirred for 2 hrs to form a polyurethane prepolymer. After 1 hr of reaction time 0.04 g of tinoctoate was added as catalyst. The reaction was cooled down and the amount of remaining NCO appeared to be 2.82%.

200 g of the polyurethane prepolymer was mixed with 3.99 g of triethylamine and the mixture was added slowly to 304.16 g of water containing 22.16 g of product of example 1, 1.02 g of triethylamine and 6 g of sodium dioctylsulfosuccinate while stirring. The dispersion was stirred for 30 min. The NCO-signal in the IR-spectrum at 2240 cm$^{-1}$ was disappeared.

The product was characterised by a solids amount of 30%, a viscosity of 300 cps, a pH of 8.8, opaque appearance, a hydrazone functionality of 0.106 meq/g and a ketone functionality of 0.099 meq/g.

What is claimed is:

1. An aqueous dispersion of a crosslinkable polyurethane wherein said dispersion is obtained by chain extension of a polyurethane prepolymer with a chain extender or chain terminating group which is a compound containing at least one hydrazone function having the general formula:

 (1)

wherein each of $Q^1$ and $Q^2$ is a hydrazone functional group of formula (2), H or $R^1$

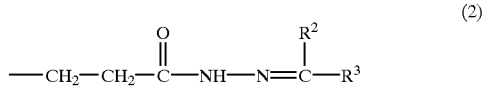 (2)

R and $R^1$ in formula (1) is an organic group which has no reactivity towards the hydrazone function, $R^2$ and $R^3$ in formula (2) is an organic group which as no reactivity towards the hydrazone function, and x has a value from 1 to 10, with the proviso that at least one of the groups $Q^1$ or $Q^2$ has formula (2).

2. The aqueous polyurethane dispersion of claim 1 containing as chain extender or chain terminating group a hydrazone functional compound of formula (1), wherein at least one of the groups $Q^1$ or $Q^2$ is H.

3. The aqueous polyurethane dispersion of claim 1 wherein said hydrazone functional compound contains at least two amino groups which contain hydrogen.

4. The aqueous polyurethane dispersion of claim 1, wherein the chain extender or chain terminating group is prepared by reacting a hydrazide functional compound of formula

 (4)

wherein $P^1$ and $P^2$ is a hydrazide functional group of formula (3), H, or $R^1$,

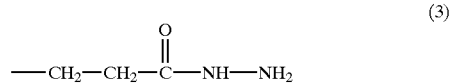 (3)

R and $R^1$ and x are as in formula (1)

with the proviso that at least one of the groups $P^1$ and $P^2$ has formula (3)

with an equimolar amount of a ketone functional compound of formula

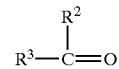

wherein $R^2$ and $R^3$ are as in formula (2).

5. The aqueous polyurethane dispersion of claim 4, wherein the hydrazide functional compound is selected from the group consisting of hydrazide functional alkylamines, cycloalkylamines, arylamines, alkylpolyamines, cycloalkylpolyamines, arylpolyamines, alkylaminocycloalkyl-amines, polyalkoxyamines, polyalkoxypolyamines, aminoalkylamines, and aminopoly(alkylamines).

6. The aqueous polyurethane dispersion of claim 4, wherein the hydrazide functional compound is hydrazide functional 5-amino-1,3,3-trimethyl-cyclohexanemethylamine, methylpentanediamine, diaminohexane, 3,3'-dimethyl-4,4'-diaminodiyclohexylmethane, 4,4'-diaminodicyclohexylmethane, polyoxypropylenediamines with molecular weight of around 230, 400 or 2000, polyoxethylenediamines with a molecular weight of around 600, 900, 2000, 4000 or 6000, polyalkoxyethyleneamines with molecular weight of around 600, 1000, 2000, polyoxypropylenetriamines with a molecular weight of around 470, fatty alkylamines with a mean molecular weight from 140 to 550, and (fatty alky)aminopropylamines with a mean molecular weight from 280 to 360.

7. The aqueous polyurethane dispersion of claim 4, wherein the ketone is acetone or butyl ketone.

8. A process for the preparation of an aqueous dispersion of a crosslinkable polyurethane containing hydrazone functions of claim 1 comprising:

dispersing an isocyanate functional polyurethane prepolymer in water; and chain extending the prepolymer with a hydrazone functional product containing at least two hydrogen functional amino groups.

9. The process according to claim 8 in which a hydrazone functional compound according to formula (1) is used as chain extender and/or capping agent, wherein at least one of the groups $Q^1$ or $Q^2$ is H.

10. A process for the preparation of a self-crosslinkable aqueous dispersion of a hydrazone and ketone functional polyurethane by using an isocyanate functional prepolymer containing ketone functions in the process of claim 8.

11. A process for the preparation of a crosslinked film or a crosslinked coating onto a substrate, comprising:

mixing the polyurethane dispersion according to claim 1 with a polyisocyanate, polyketone or polyepoxy functional compound or polymer or dispersion in which the ratio of functional groups hydrazone: isocyanate or ketone is from 0.5:1 to 1.5:1 and in which the ratio of hydrazone: epoxy is from 0.3:1 to 1.2:1;

applying said mixture onto a substrate; and evaporating water.

12. A process for the preparation of a crosslinked film or of a crosslinked coating onto a substrate by crosslinking the dispersion of a hydrazone and ketone functional polyurethane according to claim 10 comprising:

applying the dispersion onto a substrate and crosslinking the same by evaporation of water.

13. A process for the preparation of a crosslinked film or a crosslinked coating onto a substrate comprising:

preparing a mixture of a hydrazone functional material according to claim 4, in which $Q^1$ or $Q^2$ is $R^1$ or a hydrazone functional group of formula (2) with an aqueous dispersion of a polyketone, or poly-epoxy, or polyisocyanate functional compound or polymer;

applying said mixture onto a substrate; and evaporating water.

14. The aqueous polyurethane dispersion of claim 1 wherein x has a value from 1 to 4.

15. The process of claim 13 wherein the preparing step comprises preparing a mixture of a hydrazone functional material in which $Q^1$ or $Q^2$ is $R^1$ or a hydrazone functional group of formula (2) with an aqueous dispersion of a polyketone or poly-epoxy functional compound or polymer, with a water dispersible polyisocyanate functional compound or polymer, or with an aqueous dispersion of a polyisocyanate functional compound or polymer in which the ratio of functional groups hydrazone: isocyanate or ketone is from 0.5:1 to 1.5:1 and in which the ratio of hydrazone: epoxy is from 0.3:1 to 1.2:1.

* * * * *